(12) United States Patent
Saenger Nayver et al.

(10) Patent No.: US 10,547,783 B2
(45) Date of Patent: Jan. 28, 2020

(54) IMAGING DEVICE WITH SWITCHABLE DAY AND NIGHT MODES

(71) Applicant: Gentex Corporation, Zeeland, MI (US)

(72) Inventors: Mario F. Saenger Nayver, Zeeland, MI (US); Joshua D. Lintz, Allendale, MI (US); George A. Neuman, Holland, MI (US); Adam R. Heintzelman, Grand Rapids, MI (US); William L. Tonar, Holland, MI (US); Xiaoxu Niu, Holland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 0 days.

(21) Appl. No.: 15/962,408

(22) Filed: Apr. 28, 2018

(65) Prior Publication Data

US 2018/0316859 A1 Nov. 1, 2018

Related U.S. Application Data

(60) Provisional application No. 62/492,445, filed on May 1, 2017.

(51) Int. Cl.
*H04N 5/232* (2006.01)
*H04N 5/33* (2006.01)
(Continued)

(52) U.S. Cl.
CPC ......... *H04N 5/23245* (2013.01); *G02F 1/137* (2013.01); *G02F 1/133365* (2013.01);
(Continued)

(58) Field of Classification Search
CPC .. H04N 5/23245; H04N 5/23229; H04N 5/33; G02F 1/137; G02F 1/133365; G02F 1/163; G02F 1/133528
(Continued)

(56) References Cited

U.S. PATENT DOCUMENTS 5,619,266 A 4/1997 Tomita et al.
5,928,572 A 7/1999 Tonar et al.
(Continued)

FOREIGN PATENT DOCUMENTS

EP 3151544 A1 4/2017
RU 2456660 C2 7/2012
(Continued)

OTHER PUBLICATIONS

Search Report and Written Opinion of the International Searching Authority, International Application No. PCT/US2018/029320, dated Aug. 9, 2018 (9 pages).

*Primary Examiner* — Hee-Yong Kim
(74) *Attorney, Agent, or Firm* — Price Heneveld LLP; Bradley D. Johnson (57) ABSTRACT

An imaging device is disclosed. The device comprises an image sensor configured to capture image data and a filter. The filter is configured to selectively control a range of wavelengths of light entering the image sensor. The filter comprises a liquid crystal structure configured to pass the range of wavelengths in a first configuration and reflect the range of wavelengths in a second configuration. The device further comprises a controller in communication with the image sensor and the filter. The controller is configured to adjust the filter from the first configuration to the second configuration in response to an environmental lighting condition.

20 Claims, 6 Drawing Sheets

(51) Int. Cl.
  *G02F 1/137* (2006.01)
  *G02F 1/1333* (2006.01)
  *G02F 1/1335* (2006.01)
  *G02F 1/163* (2006.01)
(52) U.S. Cl.
  CPC ........ *G02F 1/133528* (2013.01); *G02F 1/163* (2013.01); *H04N 5/23229* (2013.01); *H04N 5/33* (2013.01); *G02F 2001/133541* (2013.01); *G02F 2203/02* (2013.01); *G02F 2203/055* (2013.01); *G02F 2203/11* (2013.01)
(58) Field of Classification Search
  USPC ........................................................ 348/148
  See application file for complete search history.

(56) References Cited

U.S. PATENT DOCUMENTS

| | | | |
|---|---|---|---|
| 5,998,617 A | 12/1999 | Srinivasa et al. | |
| 6,020,987 A | 2/2000 | Baumann et al. | |
| 6,037,471 A | 3/2000 | Srinivasa et al. | |
| 6,137,620 A | 10/2000 | Guarr et al. | |
| 6,141,137 A | 10/2000 | Byker et al. | |
| 6,193,912 B1 | 2/2001 | Thieste et al. | |
| 6,241,916 B1 | 6/2001 | Claussen et al. | |
| 6,249,369 B1 | 6/2001 | Theiste | |
| 6,519,072 B2 | 2/2003 | Nishikitani et al. | |
| 8,237,909 B2 | 8/2012 | Ostreko et al. | |
| 8,411,245 B2 | 4/2013 | Lee et al. | |
| 2011/0249159 A1 | 10/2011 | Fukunaga | |
| 2011/0262053 A1* | 10/2011 | Strandemar | G06K 9/6289 382/263 |
| 2012/0026325 A1* | 2/2012 | Bunker | G03B 11/00 348/143 |
| 2012/0133878 A1* | 5/2012 | Hirakata | G02F 1/133528 349/141 |
| 2012/0219707 A1* | 8/2012 | Asanoi | C08F 2/48 427/162 |
| 2017/0140221 A1* | 5/2017 | Ollila | G06K 9/00604 |
| 2018/0180486 A1* | 6/2018 | Pau | H04N 9/07 |

FOREIGN PATENT DOCUMENTS

| | | |
|---|---|---|
| WO | 9842796 A1 | 10/1998 |
| WO | 9902621 A1 | 1/1999 |

* cited by examiner

IMAGING DEVICE WITH SWITCHABLE DAY AND NIGHT MODES

CROSS-REFERENCE TO RELATED APPLICATION

This application claims priority to and the benefit under 35 U.S.C. § 119(e) of U.S. Provisional Patent Application No. 62/492,445, filed on May 1, 2017, entitled "IMAGING DEVICE WITH SWITCHABLE DAY AND NIGHT MODES," the entire disclosure of which is hereby incorporated herein by reference.

TECHNOLOGICAL FIELD

The present invention generally relates to an imager module and, more particularly, relates to an imaging device configured to control a transmission of entering light.

BRIEF SUMMARY

In one aspect of the disclosure, an imaging device is disclosed. The device comprises an image sensor configured to capture image data and a filter. The filter is configured to selectively control a range of wavelengths of light entering the image sensor. The filter comprises a liquid crystal structure configured to pass the range of wavelengths in a first configuration and reflect the range of wavelengths in a second configuration. The device further comprises a controller in communication with the image sensor and the filter. The controller is configured to adjust the filter from the first configuration to the second configuration in response to an environmental lighting condition.

In another aspect of the disclosure, a method for capturing image data for a vehicle imaging system is disclosed. The method comprises selectively filtering visible light through a filter from light entering an imaging device and passing near infrared (NIR) light to an image sensor. The method additionally comprises capturing first image data comprising the NIR light with the visible light filtered and capturing second image data comprising the visible light. Contour features are extracted from the first image data. The contour features are combined with the second image data thereby generating hybrid image data. The hybrid image data comprises the contour features from the first image data combined with color information from the second image data.

In yet another aspect of the disclosure, an imaging device is disclosed. The device comprises an image sensor configured to capture image data and a plurality of filters configured to selectively transmit at least a two wavelength bands of light entering the image sensor. The plurality of filters comprise a first filter and a second filter. The first filter comprises a liquid crystal structure configured to transmit a first band of the wavelength bands in a first configuration and reflect the first band in a second configuration. The second filter is configured to suppress a second band of the wavelength bands.

These and other features, advantages, and objects of the present invention will be further understood and appreciated by those skilled in the art by reference to the following specification, claims, and appended drawings.

DETAILED DESCRIPTION

It is to be understood that the invention disclosed herein may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Figure 1:
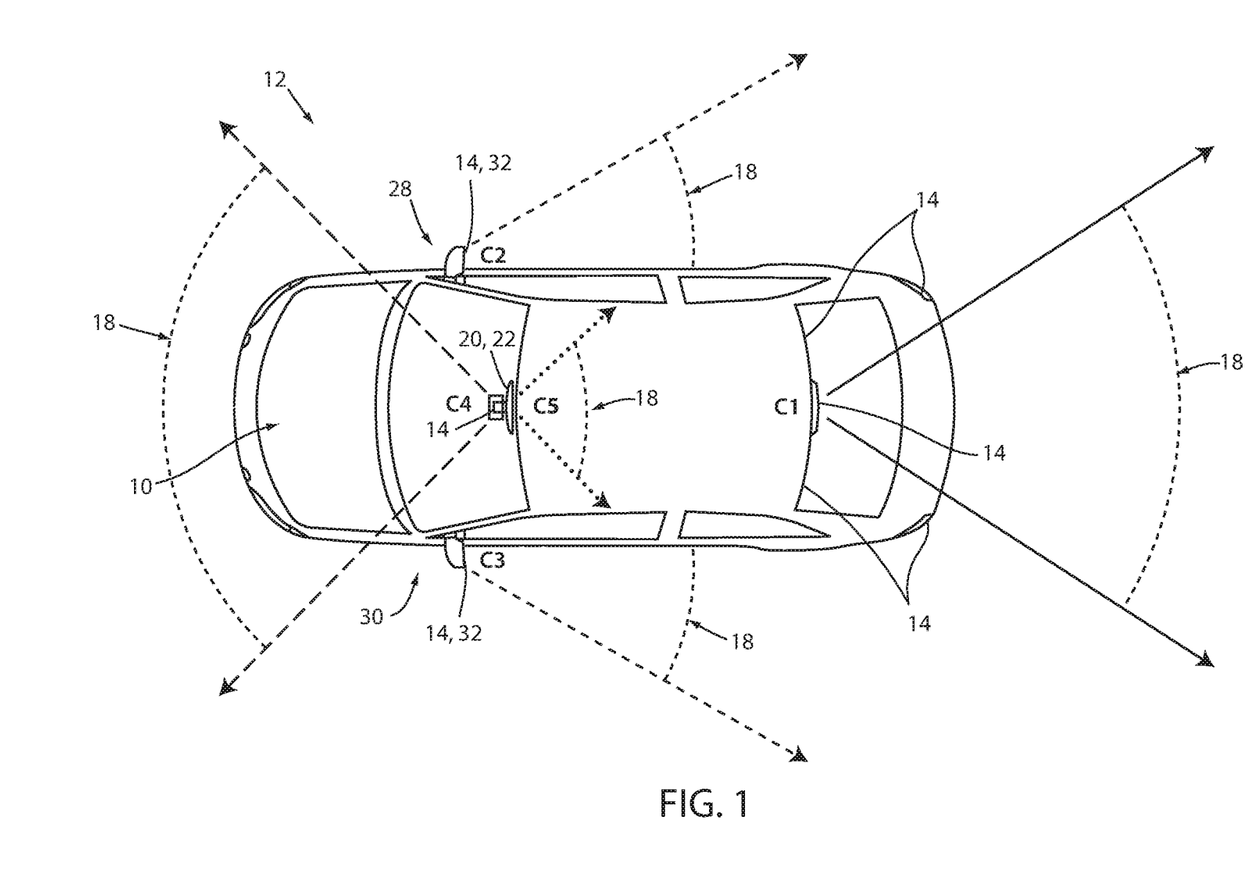
FIG. 1 is an overhead view of a vehicle comprising an imaging system.

FIG. 1 demonstrates an elevational view of a vehicle 10 comprising an imaging system 12. Vehicles will require more sensors and cameras as more autonomous functions are added to the vehicle. Practical limitations may exist in the number of sensors that can be added. It is beneficial, therefore, to develop camera and sensor systems that are capable of multiple functions. This will not only reduce the immediate complexity of the sensor system itself, but it will also require less wiring and support infrastructure.

In the case of cameras, additional cost savings may be obtained by integrating additional functionality into a single camera. For example, a traditional camera may comprise a sensor, which is sensitive to visible and near-infrared light. To achieve good color rendering, the near infrared (NIR) light must be blocked. This adds cost to the system. A dual use system of the present invention may enable multi-functional operation of sensors at reduced overall cost.

Figure 2:
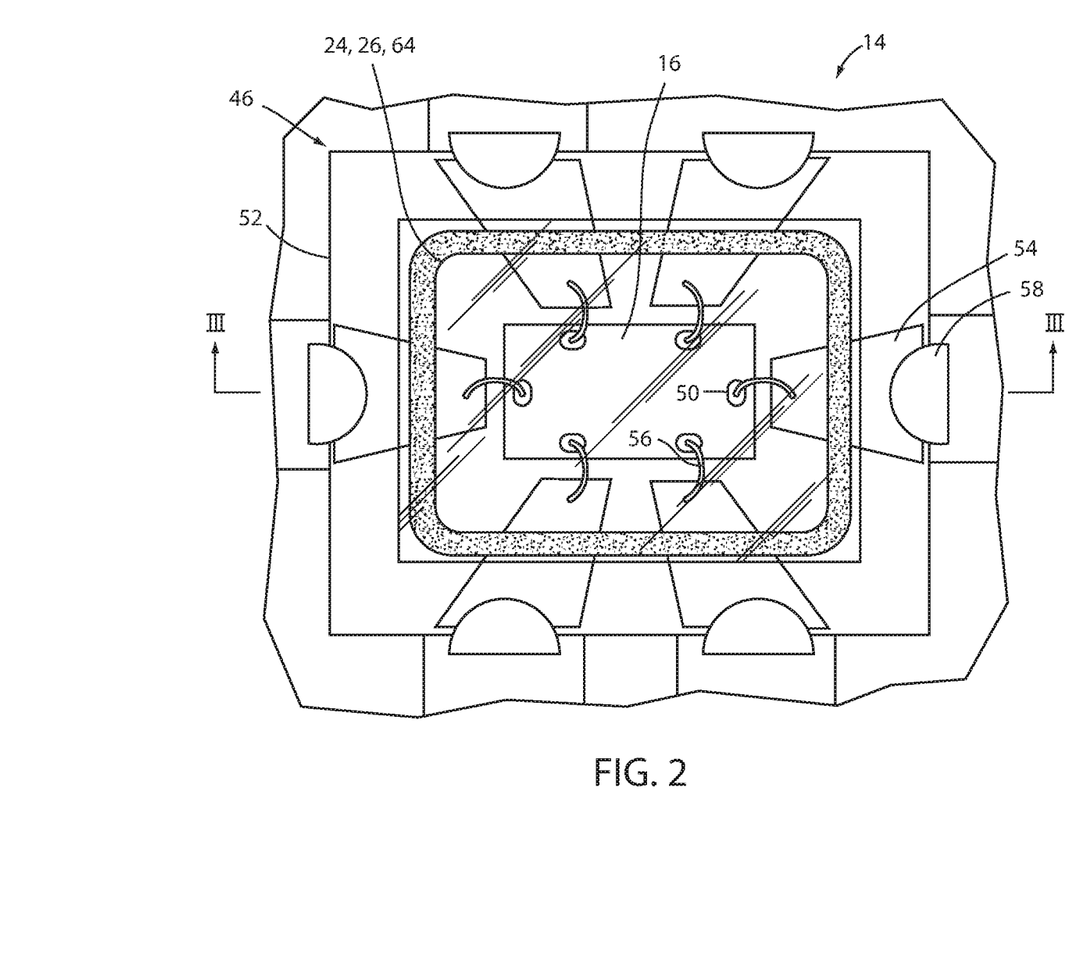
FIG. 2 is a top view of an imaging device.

FIG. 2 demonstrates a detailed view of an imaging device 14 comprising an image sensor 16 in accordance with the disclosure. Referring to FIGS. 1 and 2, the imaging system 12 may comprise one or more imaging devices 14. In some embodiments, the imaging system 12 may comprise a plurality of imaging devices 14 including a first imaging device C1, a second imaging device C2, a third imaging device C3, and a fourth imaging device C4. An image sensor 16 of each of the imaging devices 14 may have a field of view 18 focusing on an environment proximate the vehicle 10. In the various embodiments discussed herein, the imaging devices C1-C4 may be implemented to provide views of the environment proximate the vehicle 10 that may be displayed on the display screen 20 or any form of display device. The display screen 20 may be incorporated in a rearview display 22, positioned similar to a conventional rearview mirror, incorporated in an interior console, or provided in various portions of the vehicle 10.

One or more of the imaging devices 14 may comprise an active light filter 24 configured to reflect or absorb a range of wavelengths of light. For example, in some embodiments, the filter 24 may be configured to limit the transmission of a range or plurality of ranges of light from entering the image sensor 16. The active light filter 24 may be selectively activated based on an operating environment of the vehicle 10 such that one or more wavelengths or ranges of wavelengths of light are reflected or absorbed by the filter prior to entering the image sensor 16. In this way, the imaging device 14 may control the wavelengths of light received by the image sensor 16 in response to a variety of operating conditions of the vehicle 10.

Each of the imaging devices 14 may comprise a plurality of primary color filters 26 (e.g., red, green and blue color filters). For example, one can use a dielectric micropatterned color filter array with high transmission bands in the visible and NIR spectral range while maintaining a high optical density elsewhere. The primary color filters 26 may be configured to have a high level of transmittance in a near infrared range (NIR) and/or the infrared (IR) range. The NIR range may correspond to wavelengths of light approximately between wavelengths of 700 and 1000 nm or 700 to 2500 nm. The active light filter 24 may be configured to selectively filter light in the NIR range. In this way, the light in the NIR range may be selectively filtered such that all or part of the light in the NIR range is selectively prevented from entering the image sensor 16. A controller of the imaging device 14 may be operable to control the active light filter 24 such that the light in the NIR range is selectively transmitted through the active light filter 24. The controller is discussed in further detail in reference to FIG. 7.

By controlling the wavelengths of light received by the imaging devices, the system 12 may provide advantages by capturing the light in the NIR. Light in the NIR range may enhance the recognition and detection capability for the driver or for Advanced Driver Assistance Systems (ADAS) when compared to cameras detecting only in the visible spectral range. Cameras with sensitivity in the NIR range may provide a better visibility and better recognition of elements during driving, for example, of pedestrians, bicycles, animals, vehicle lights, traffic signs, road markings, and in particular during adverse environmental conditions that may include fog, rain, smoke, or snow.

In some embodiments, the controller may control the operation of the active filter 24 in response to the ambient light conditions, which may include daytime conditions and nighttime conditions. It is understood that the daytime condition refers to camera operation using visible wavelengths of light and the nighttime condition refers to using near-infrared light. The invention is not limited to solely using either mode to a specific time of day. Applications are discussed below which demonstrate the utility of using the modes separately or in conjunction with different lighting conditions.

In daytime conditions, the light in the NIR range may be filtered from the received light impinging upon the image sensor 16. In this way, the imaging device 14 may prevent high-intensity infrared light from reaching the image sensor 16 in order to increase the color sensitivity and improve the color rendering index of image data captured during daylight conditions. The effective optical density of the filter may be less than about 0.5, less than about 1, less than about 2, less than about 3, or less than about 4. The higher optical density values will provide improved color rendering values when the system is in the daylight or visible mode.

During nighttime conditions, light in the NIR range may provide beneficial information to the operator of the vehicle 10 or a driver-assistance system in communication with one or more of the imaging devices 14. Accordingly, the selective control of the active filter 24 of the imaging system 12 may be configured to selectively filter light in the NIR range to suit a variety of operations and operating conditions of the vehicle 10. In various embodiments, the disclosure provides for an imaging device that is operable to selectively control a range of light (e.g., infrared light or NIR light) received by the image sensor 16 such that valuable information in the IR or NIR range may be captured during nighttime operating conditions and filtered during daytime operating conditions. Light in the IR and NIR range may provide for visibility or detection of objects that may not otherwise be visible in the image data captured by the image sensor 16.

The controller of the imaging device 14 may be configured to control the filter 24 to reflect or otherwise inhibit the passage of a first range of wavelengths (e.g., the NIR range) during bright ambient lighting conditions that may correspond to daylight conditions. To provide for such functionality, the filter 24 may comprise a liquid crystal structure configured to reflect or inhibit the passage of light in the first range of wavelengths in a first configuration. For example, the controller may control the filter 24 to significantly inhibit the passage of the light in the first range of wavelengths in an open circuit configuration. In this way, the imaging device 14 may capture image data with high color sensitivity and improved color rendering during daylight conditions.

The color rendering index of the filter 24 and imaging system 12 may be greater than about 90, or greater than about 95 or greater than about 98. As discussed below, in some embodiments, the filter 24 or stacked filters may be optimized to transmit or block certain bands of light in the near-infrared spectrum. In embodiments, wherein the actively controlled band(s) are substantially greater than 700 nm to 800 nm, additional blocking means may be employed to improve the color rendering index of the sensor. For example, if the filter 24 is optimized for 825 nm+/−50 nm, then the light of wavelengths between up to 775 nm may pass through to the sensor. These wavelengths, in some sensor configurations, may be interpreted as red light. This will degrade the color rendering of the sensor and the resultant display image will be inappropriately biased toward the red colors.

In some embodiments, the color rendering index may be improved by adding a static blocking filter into the system. The static blocking filter may be a multilayer band pass filter, or the like, which may be located on one or more surfaces of the filter 24 between the incoming light and the image sensor 16. In this manner, the active filter 24 may still be employed and high color rendering indices may be achieved. The effective optical density of the static filter may be less than about 0.5, less than about 1, less than about 2, less than about 3, or less than about 4. The higher optical density values along with the wavelength band blocked by the filter will provide improved color rendering values when the system is in the daylight or visible mode and can be selected to achieve the desired color rendering index of the system.

In some embodiments, the active light filter 24 may be configured to limit a haze level of the liquid crystal material or structure. The haze level of the filter 24 may be less than 10%, under 5%, or under 1%. Increasing haze values may reduce the image quality of the image sensor 16 and, therefore, a transmitted haze as small as possible may be desirable. The switching time between the configurations of the filter 24 may be under 1 second, preferably under 0.1 seconds, most preferably under 0.01 seconds. Many liquid crystal materials will align for instance parallel to an applied electric field at a low frequency and perpendicular to the electric field at high frequency. This behavior may be used to effectively drive a liquid crystal device or structure of the active light filter 24 both on and off for faster response times at a given temperature.

The controller of the imaging device 14 may further be configured to control the filter 24 to significantly pass the light in the first range of wavelengths (e.g., the NIR range) during dark ambient lighting conditions that may correspond to nighttime conditions. Accordingly, the controller may control the liquid crystal structure of the filter 24 to pass the light in the first range of wavelengths in a second configuration. For example, the controller may control the filter 24 to significantly pass the light in the first range of wavelengths in a closed circuit configuration. In this way, the imaging device 14 may selectively capture image data including light in the IR or NIR range during nighttime conditions. An exemplary embodiment of the imaging device 14 and further discussion of the filter 24 are discussed in reference to FIGS. 2-5.

Referring again to FIG. 1, the imaging devices 14 may be arranged in various locations on the vehicle 10. In an exemplary embodiment, the imaging devices 14 may be arranged such that each of a plurality of fields of view 18 of the imaging devices C1-C4 is configured to capture a significantly different portion of the surrounding environment. Each of the imaging devices 14 may comprise any form of device configured to capture image data. For example, the imaging devices 14 may be implemented as Charge Coupled Devices (CCD) and Complementary Metal Oxide Semiconductor (CMOS) image sensors.

In some embodiments, one or more of the imaging devices 14 may also comprise specialized infrared (IR) image sensors, which may correspond to thermal imaging cameras comprising focal plane arrays (FPAs) configured to respond to wavelengths 9000-14000 nm (e.g., intermediate and long wavelength infrared). Some types of IR image sensors may include InSb FPAs, InGaAs FPAs, and quantum-well infrared photodetectors QWIP FPAs. Additionally, microbolometers (e.g., amorphous silicon (a-Si), vanadium oxide (VOx)) may be implemented as FPA image sensors. In some embodiments, one or more of the imaging devices 14 may comprise a near-infrared enhanced CMOS sensor, where the sensor may have a thicker epitaxial layer providing higher quantum efficiencies for wavelengths between 700 to 1000 nm.

Though four imaging devices C1, C2, C3, and C4 are discussed in reference to the present implementation, the number of imaging devices 14 may vary based on the specifications of the particular imaging devices and/or the desired number of fields of view 18 for the display screen 20. For example the imaging devices 14 may include a fifth imaging device C5 configured to capture image data in a field of view 18 directed into a passenger compartment of the vehicle 10. The fifth imaging device C5 may be disposed in a housing of the rearview display 22, interior panel, or any other portion of the vehicle 10.

The imaging devices C1, C2, C3, and C4 may be disposed on the vehicle 10 and oriented such that each field of view 18 of the imaging devices 14 is directed toward a substantially different region. A first imaging device C1 may be disposed centrally on a rear facing portion of the vehicle 10 proximate a tailgate or similar area of the vehicle 10. In some embodiments, the imaging device C1 may be disposed proximate a rear-bumper and/or a center high mount stop light (CHMSL). A second imaging device C2 and a third imaging device C3 may be disposed on a passenger's side 28 and a driver's side 30 of the vehicle 10, respectively. The second imaging device C2 and the third imaging device C3 may be configured to capture image data corresponding to the environment proximate the side regions of the vehicle 10. The fourth imaging device C4 may be configured to capture image data in a forward direction relative to an operating direction of the vehicle 10. The fourth imaging device C4 may be disposed in a housing of the rearview display 22 or any other portion of the vehicle 10 positioned to capture image data forward of the vehicle 10.

In some implementations, the second imaging device C2 and the third imaging device C3 may be incorporated in side mirrors 32 of the vehicle 10. The imaging devices C2 and C3, in combination with the first imaging device C1, may be configured to capture image data corresponding to a rearward-directed region relative the forward direction of the vehicle 10. In some embodiments, the imaging devices 14 may be configured to capture an increased or decreased viewing angle depending on the particular application. In some embodiments, the imaging devices may be configured to capture approximately the entire environment surrounding the vehicle 10.

Figure 3:
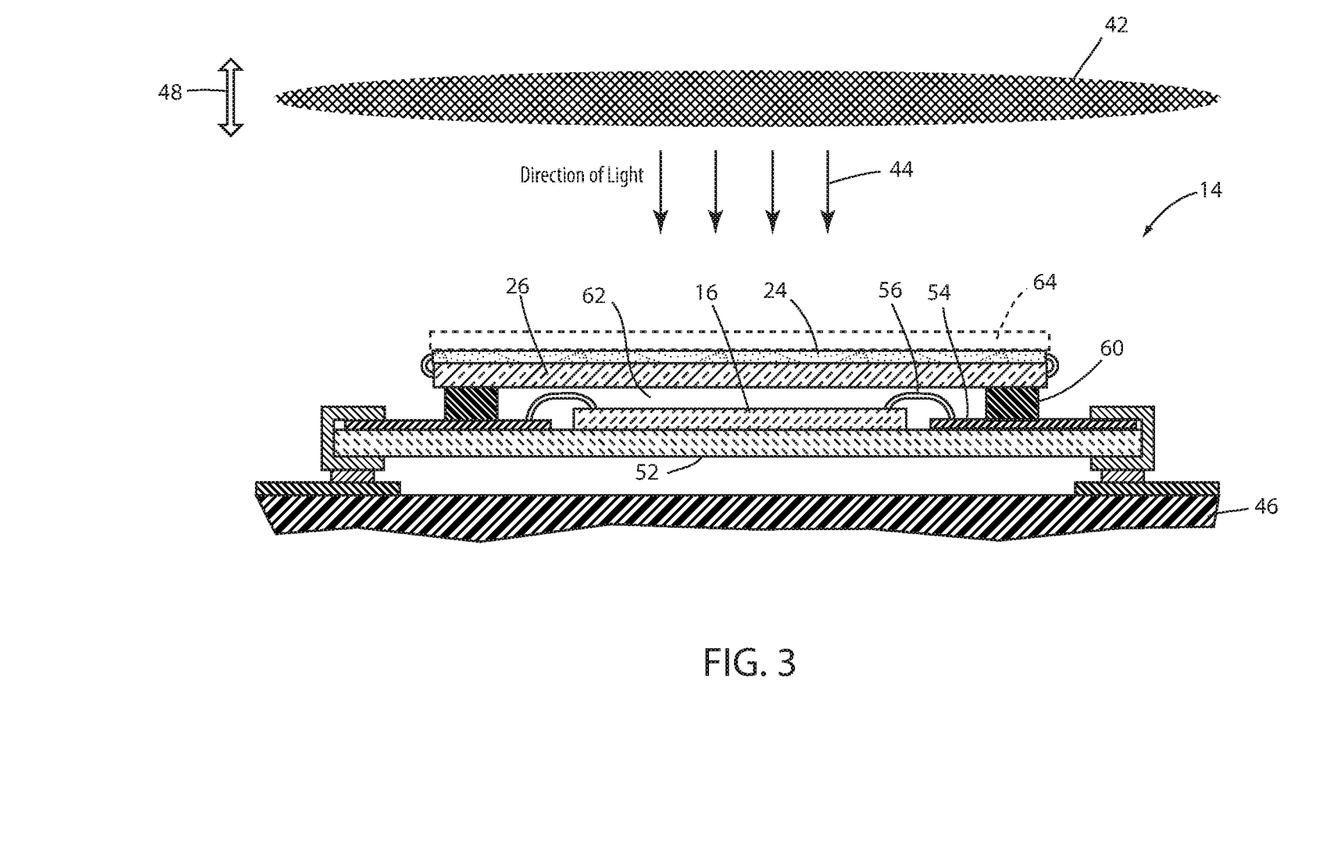
FIG. 3 is a cross-sectional view of the imaging device demonstrated in FIG. 2 along section line 3-3.

Referring now to FIGS. 2 and 3, an overhead view and a cross-sectional view of an exemplary embodiment of the imaging device 14 are shown, respectively. In typical operation, a focusing lens 42 may be utilized in combination with the imaging device 14 to focus entering light 44 received by the imaging device 14. The focusing lens 42 may be in connection with a lens assembly, which may further be in connection with an enclosure assembly 46 configured to house the image sensor 16. In this configuration, the focusing lens 42 may be adjusted as demonstrated by an arrow 48 to adjust the focus and/or the focal distance of the entering light 44 entering the image sensor 16. The enclosure assembly 46 may be designed to be mounted on a support substrate 52.

The support substrate 52 may correspond to a printed circuit board, flexible circuit, ceramic substrate, or the like. FIGS. 2 and 3 show the active filter 24 located between the image sensor 16 and the lens 42. It is understood that alternate embodiments are considered wherein the filter 24 is located forward of the lens 42 or other lenses in the lens assembly or even forward of all lenses in the lens assembly. Additionally, the system may comprise anti-reflection coatings on one or more of the surfaces of the lenses or other component surfaces. The anti-reflection coating may be optimized for at least one of the visible or near infrared spectrum or may demonstrate a broadband anti-reflection property over wavelengths of interest for a given embodiment. A motheye anti-reflection, graded interface, or other suitable broadband anti-reflection coating may be used.

The image sensor 16 may be integrated as an integrated device comprising an array of pixel sensors and support electronics. Accordingly, the image sensor 16 may comprise imaging electronics, such as pixel sensors, constructed on the image sensor 16. The imaging electronics may be connected to bonding pads 50 configured to provide bonding points for connections of the image sensor 16. In this configuration, the image sensor 16 may be configured for various applications. The bonding pads 50 are not shown in the cross-sectional views for clarity.

In various embodiments, the image sensor 16 may be attached to a top side of a base substrate 52. The image sensor 16 may be attached by adhering a bottom side of the image sensor 16 to the base substrate 52. The base substrate 52 may be constructed from a non-conducting material, such as glass or ceramic. Though specific examples of materials are provided for the base substrate 52 as well as various additional elements of the imaging device 14, such information is provided to better describe exemplary embodiments and should not be considered limiting to the scope of the disclosure.

Conductive strips 54 may provide for conductive communication from the image sensor 16 to an edge of the base substrate 52. A wire 56 may be configured to connect pads on the image sensor 16 with the conductive strips 54. The base substrate 52 may further provide for conductive communication with one or more processors or circuits via a plurality of traces 58. In this configuration, the one or more processors, which may form the controller of the imaging device 14, may receive image data from the image sensor 16 via the wire 56. The wire 56 is in communication with the conductive strip 54, which is further in connection with the trace 58 of the base substrate 52. In this configuration, the image sensor 16 may communicate image data to a processor or image processor to provide image data for various applications.

A seal material 60 may surround the image sensor 16 and enclose each of the wires 56. The seal material 60 may be spaced from the edge of the base substrate 52 such that a seal material 60 does not interfere with the assembly of clips onto the base substrate 52. The filter 24 may be attached to the base substrate 52 in a spaced-apart relationship, which may be determined by a thickness of the seal material 60. The filter 24 may comprise the liquid crystal structure configured to selectively control the passage of the light in the NIR range and may also comprise one or more primary color filters 26 (e.g., red, green and blue color filters). The primary color filters 26 may be configured to have a high level of transmittance in a near infrared (NIR) range and/or the infrared (IR) range. The optical density of the primary color filters 26 in the NIR or IR should be less than about 1, less than about 0.5, or less than about 0.1. As discussed herein, the filter 24 may be configured to control a passage or transmittance of light rays 44 into the imaging electronics of the image sensor 16. In this configuration, the base substrate 52, the seal material 60, and the filter 24 may form a cavity 62 containing an image sensor 16.

In some embodiments, the system 12 may further comprise an electro-optic element 64. The electro-optic element 64 may be located in the optical path to the image sensor 16 between the image sensor 16 and the entering light 44 and may be arranged in a stacked configuration with the active filter 24 and the primary color filters 26. The electro-optic element 64 may be configured to block and/or control a transmission of visible light into the image sensor 16. In this configuration, the controller of the imaging system 12 may be configured to control the active filter 24 to control the NIR light entering the imager independently of the electro-optic element 64 to control the amount of visible light entering the image sensor 16. For example, the controller may be configured to increase the visibility of elements on a road during a day with fog. With appropriate detection algorithms, red, green, blue (RGB) and NIR imaging data collected by the image sensor 16 may be utilized to gather information about the road condition, such as the presence of water or ice.

Figure 4A:
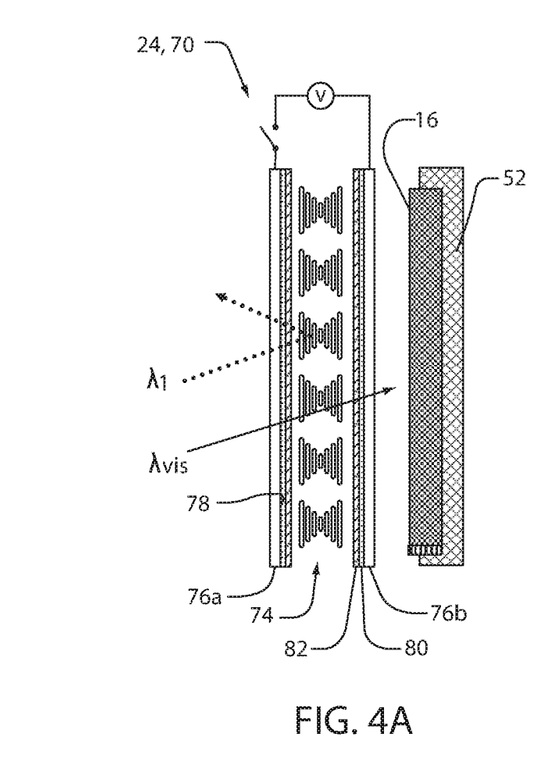
FIG. 4A is a schematic diagram of a filter configured to control a transmission of light of a range of wavelengths in a first configuration.
Figure 4B:
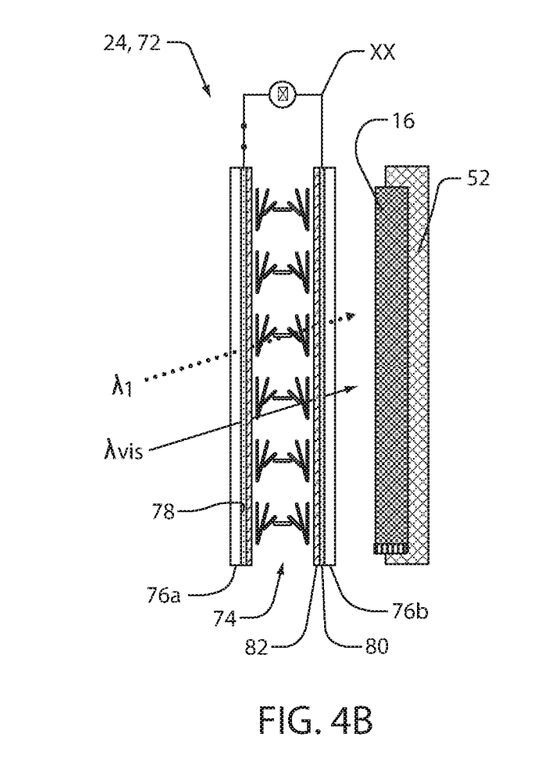
FIG. 4B is a schematic diagram of a filter configured to control a transmission of light of a range of wavelengths in a second configuration.

Referring now to FIGS. 4A and 4B, the filter 24 is shown in first configuration 70 and a second configuration 72. The filter 24 may comprise a liquid crystal structure 74, which may correspond to a chiral liquid crystal mixture. In some embodiments, the liquid crystal structure 74 may correspond to a chiral liquid crystal polymer disposed between a first substrate 76a and a second substrate 76b. The substrates 76a, 76b may correspond to glass or other substantially light-transmissive materials and may comprise one or more layers disposed on an interior surface 78 in conductive connection with the liquid crystal structure 74. The substrates 76a, 76b may be less than about 1 mm, alternatively less than about 0.5 mm, or less than about 0.3 mm. The layers may correspond to a conductive layer 80 and an alignment layer 82. The conductive layer 80 may correspond to a transparent conductive layer, which may be formed of indium tin oxide or other conductive, light transmissive materials (Visible, NIR, IR as appropriate). The alignment layer 82 may be configured to adjust an alignment of the liquid crystal structure 74 in response a voltage applied to the conductive layer 80 by the controller of the imaging device 14.

As illustrated, the first configuration 70 may correspond to an open circuit configuration. The second configuration 72 may correspond to a closed circuit configuration. In the first configuration 70, the liquid crystal structure 74 may be arranged in a neutral state, wherein a helical twist structure may be formed due to an arrangement of the chiral liquid crystal polymer. The arrangement of the helical twist structure in the first configuration 70 may provide for a first range $\lambda_1$ of wavelengths of light to be reflected away from the image sensor 16. In the second configuration 72, a voltage potential may be applied across the conductive layers 80 of the first substrate 76a and the second substrate 76b. The voltage potential may cause the helical twist structure to become skewed thereby allowing the first range $\lambda_1$ of wavelengths of light to pass through the filter 24 and be received by the image sensor 16.

Additionally, in some embodiments, the filter 24 and other filters discussed herein may be used in combination with a polarizing filter. For example, the filter 24 may be used in combination with a high transmission circular polarizing filter in a stacked configuration with the filter 24. The circular polarizing filter may comprise a linear polarizer and a quarter-wave plate. In this configuration, the linearly polarized light leaving the linear polarizer may be transformed into circularly polarized light by the quarter-wave plate. In this way, the handedness of the circularly polarized light leaving the circular polarizer may be controlled such that the filter 24 may effectively block both right-handed and left-handed polarizations of light. The circular polarizing filter may be configured to selectively absorb or pass clockwise and counter-clockwise circularly polarized light. In this configuration, the filter 24 may be used in combination with the circular polarizing filter to complement the handedness of the polarization of the filter 24.

For example, if the filter 24 comprises a right-handed helical structure configured to block right-handed polarized light, the circular polarizing filter may be configured to block left-handed polarized light. Conversely, if the filter 24 comprises a left-handed helical structure configured to block left-handed polarized light, the circular polarizing filter may be configured to block right-handed polarized light. Accordingly, the combination of the filter 24 and the circular polarizing filter may be operable to selectively block left-handed polarized NIR light and right-handed polarized NIR light based on the combined filtering of the circular polarizing filter and the filter 24. Though discussed specifically in reference to the filter 24, the circular polarizing filter may similarly be utilized in combination with any of the filters discussed herein.

In some embodiments, the alignment layer 82 may correspond to a chiral alignment layer of polyimide. Additionally, the liquid crystal structure 74 may correspond to a chiral molecular subset comprising a nematic host with a chiral dopant. In this configuration, the filter 24 may correspond to a chiral nematic filter configured to inhibit the transmission of light in a particular range of wavelengths through the crystal structure 74. Though specific examples of the active filter 24 are discussed in reference to particular materials and combinations, it shall be understood that similar materials may be utilized to enable the operation of the filter 24 and imaging device 14 and discussed herein. Additionally, the embodiments described herein may be combined or arranged in a variety of ways without departing from the spirit of the disclosure.

As previously discussed, the light impinging on the filter 24 may comprise a wide range of wavelengths comprising visible light $\lambda_{vis}$ as well as ultraviolet light, infrared light, and NIR light. The filter 24 may be configured to inhibit or reflect the transmission of one or more ranges of light, which may be in the IR or NIR range as discussed herein. For example, the first range $\lambda_1$ of light may correspond to wavelengths of light from approximately 700 nm to 800 nm. That is, the helical structure of the liquid crystal structure 74 may be centered at a pitch configured to filter light at 750 nm and may have an effective filtering range of approximately =/−50 nm to provide for the first range $\lambda_1$ to be filtered.

Accordingly, the liquid crystal structure 74 of the filter 24 may be configured to pass light in a broad range of wavelengths while selectively limiting the transmission of light to the image sensor 16 over one or more ranges of wavelengths. In some embodiments, the filter 24 may be configured to limit the transmission of the light in a plurality of ranges. For example, the filter 24 may comprise a plurality of layers or sub-filters, each configured to reflect light over a specific range of wavelengths. The range of wavelengths reflected by the filter 24 or layers of the filter 24 may be controlled by a pitch of a helical structure of the liquid crystal structure 74. For example, each layer of the liquid crystal structure 74 may comprise a helical structure configured to provide for a Bragg reflection of approximately 50 nm with a reflectivity of 50% for circularly polarized light.

Figure 5:
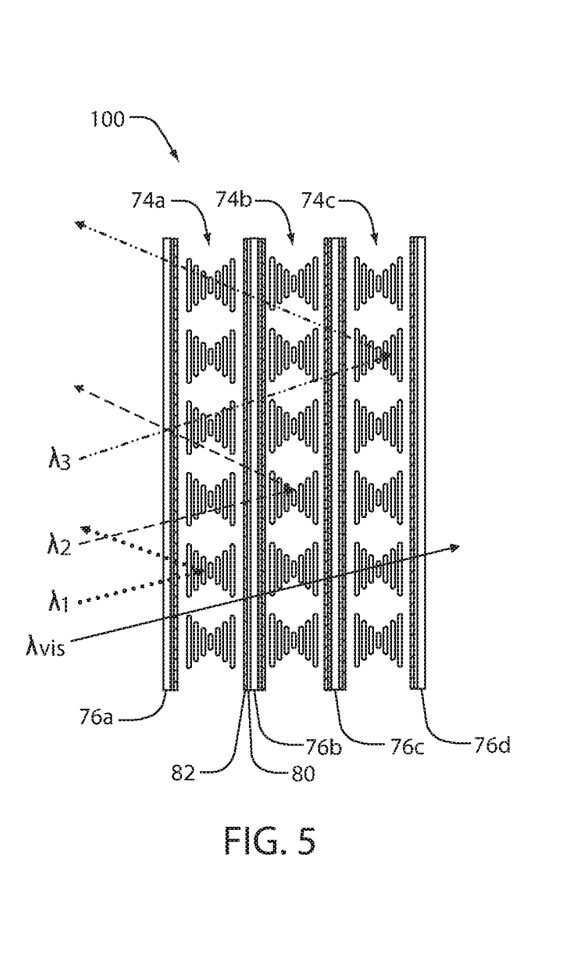
FIG. 5 is a schematic diagram of a filter configured to control a transmission of light of a range of wavelengths demonstrating a stacked configuration.

As discussed further in reference to FIG. 5, each layer of the liquid crystal structure 74 may filter a range of wavelengths of light. Additionally, each layer may be configured to filter approximately 50% of the light for a given range of wavelengths. The limited filtering of each layer may be a result of the circular polarization of the light entering the filter 24. For example, approximately a first half of the light impinging upon the filter 24 may comprise a right-handed polarization and a second half of the light may comprise a left-handed polarization. Accordingly, each liquid crystal structure 74 of the filter 24 may be configured to inhibit or reflect the light having the right-handed polarization or the left-handed polarization. Accordingly, the layers of the filter 24 may be stacked in combination to filter right-handed and left-handed polarization for each range of wavelengths in a configuration similar to that shown in FIG. 5.

In order to provide for the filtering of the light having the right-handed and left-handed polarizations, each layer of the filter may be specially configured to filter the polarized light or a desired range of wavelengths. In various embodiments, a chiral dopant utilized in the liquid crystal structure 74 may be right-handed or left-handed. A right-handed dopant may provide the structure 74 to arrange in a right-handed helical structure. A left-handed dopant may provide the structure 74 to arrange in a left-handed helical structure. The right-handed crystal helical structure may function to reflect right-handed polarized light, while the left-handed crystal helical structure may function to reflect left-handed polarized light. In this way, the layers of the filter may be stacked or combined to control the light passed through the filter 24 into the image sensor 16.

In some embodiments, one or more stacked filters may be configured to block all or some portion of the visible spectrum while enabling transmittance of all or portions of the near-infrared spectrum. Alternatively, a filter optimized to block visible light may be replaced with the electro-optic element 64, wherein the visible portion of the spectrum is controlled via this or other, alternate technologies. The benefit to having independent control of the visible and near-infrared light is detailed below.

The pitch of the helical structure of some chiral liquid crystal polymers or cholesteric liquid crystals may vary with temperature. Such changes in the pitch may lead to a shift in the wavelengths blocked by the filters and a corresponding shift in the bandwidths of light (e.g., the ranges $\lambda_1$, $\lambda_2$, and $\lambda_3$) attenuated by the filters discussed herein. To limit temperature-related shifts changing the performance of the filters, the cholesteric materials utilized to produce the chiral liquid crystal polymers may be selected from species that exhibit only a small or negligible pitch shift in response to temperature. Additionally, the chiral liquid crystal polymers may include one or more stabilizing additives configured to stabilize the pitch (e.g., a polymerizable liquid crystal monomer additive). In this way, the performance of the filters discussed herein may be consistent over a temperature range anticipated for operation.

Additionally, in some embodiments, the filter 24 and other filters discussed herein may be used in combination with a polarizing filter. For example, the filter 24 may be used in combination with a high transmission circular polarizing filter. The circular polarizing filter may comprise a linear polarizer and a quarter-wave plate. In this configuration, the linearly polarized light leaving the linear polarizer may be transformed into circularly polarized light by the quarter-wave plate. In this way, the handedness of the circularly polarized light leaving the circular polarizer may be controlled such that the filter 24 may effectively block both right-handed and left-handed polarizations of light. The circular polarizing filter may be configured to selectively absorb or pass clockwise and counter-clockwise circularly polarized light. In this configuration, the filter 24 may be used in combination with the circular polarizing filter to complement the handedness of the polarization of the filter 24.

For example, if the filter 24 comprises a right-handed helical structure configured to block right-handed polarized light, the circular polarizing filter may be configured to block left-handed polarized light. Conversely, if the filter 24 comprises a left-handed helical structure configured to block left-handed polarized light, the circular polarizing filter may be configured to block right-handed polarized light. Accordingly, the combination of the filter 24 and the circular polarizing filter may be operable to selectively block left-handed polarized NIR light and right-handed polarized NIR light based on the combined filtering of the circular polarizing filter and the filter 24. Though discussed specifically in reference to the filter 24, the circular polarizing filter may similarly be utilized in combination with any of the filters discussed herein.

Referring now to FIG. 5 an exemplary embodiment of a stacked filter 100 is shown. The stacked filter 100 may comprise similar elements to the filter 24 and, accordingly, may utilize like reference numerals for clarity. The stacked filter 100 may comprise a plurality of substrates 76. The plurality of substrates 76 may comprise a first substrate 76a, a second substrate 76b, a third substrate 76c, and a fourth substrate 76d. The first substrate 76a and the fourth substrate 76d may comprise the conductive layer 80 and the alignment layer 82 on a single side of the substrate corresponding to the side in contact with the liquid crystal structure 74. The second substrate 76b and the third substrate 76c may comprise the conductive layer 80 and the alignment layer 82 on both sides. In this configuration, the substrates 76 may be stacked to separate a plurality of liquid crystal structures 74a, 74b, and 74c.

Each of the liquid crystal structures 74a, 74b, 74c may be configured similarly to the liquid crystal structure 74a. That is, each of the liquid crystal structures 74a, 74b, and 74c may be selectively activated to filter light in a predetermined range of wavelengths of light in the first configuration 70 (e.g., open circuit configuration) and pass the light in the second configuration 72. Each of the structures 74a, 74b, and 74c may further be configured to filter the light impinging upon the stacked filter 100 from entering the image sensor 16 in a specific range of wavelengths, which may differ for each of the structures 74a, 74b, and 74c. In this configuration, the visible light $\lambda_{vis}$ may pass through the filter while each of the structures 74a, 74b, and 74c may inhibit or reflect a first range $\lambda_1$, a second range $\lambda_2$, and a third range $\lambda_3$ of wavelengths from passing through the stacked filter 100 in the first configuration 70.

In order to provide for the filtering of each of the ranges $\lambda_1$, $\lambda_2$, and $\lambda_3$, each of the structures 74a, 74b, and 74c may be comprised of a specific chiral liquid crystal polymer. Each of the structures 74a, 74b, and 74c may be tuned such that a pitch of the helical structure of the chiral liquid crystal polymer is sized or proportioned to limit a predetermined range of wavelengths. For example, the first structure 74a may be configured to reflect light in the first range $\lambda_1$ from approximately 650 nm to 750 nm. The second structure 74b may be configured to reflect light in the second range $\lambda_2$ from approximately 750 nm to 850 nm. The third structure 74c may be configured to reflect light in the third range $\lambda_3$ from approximately 850 nm to 950 nm. In this configuration, the stacked filter 100 may be operable to selectively reflect one or more of the ranges $\lambda_1$, $\lambda_2$, and $\lambda_3$ while passing the visible light $\lambda_{vis}$ to the image sensor 16.

As noted above, the daylight and nighttime modes may be initiated under different situations other than simply based on ambient light intensity levels. For example, under circumstances, such as fog or smog, IR or NIR light may penetrate and enable imaging better than visible light. In these and other circumstances, the mode of the camera may be switched from visible to IR/NIR to provide optimal information about the scene. In other embodiments, the modes may be interlaced enabling a simultaneous visible video feed with infrared machine analysis one or more of the fields of view 18. In some embodiments, the image data from the NIR light range may be combined with the visible range during daytime or in conditions where there is a high amount of detectable visible light. For example, such a configuration could be desirable to enhance visibility during a day with fog or smog. In some embodiments, an electro-optic device 64 may be incorporated in the optical path to the image sensor 16. In a situation where the NIR mode is in use, the electro-optic device 64 may darken thereby reducing the visible light and the filter 24 may be activated permitting the pass of NIR wavelengths to the image sensor 16.

The electro-optic device 64, as disclosed herein, may be implemented as an electrochromic device comprising a single-layer, single-phase component, multi-layer component, or multi-phase component, as described in U.S. Pat. No. 5,928,572 entitled "Electrochromic Layer and Devices Comprising Same," U.S. Pat. No. 5,998,617 entitled "Electrochromic Compounds," U.S. Pat. No. 6,020,987 entitled "Electrochromic Medium Capable of Producing a Pre-selected Color," U.S. Pat. No. 6,037,471 entitled "Electrochromic Compounds," U.S. Pat. No. 6,141,137 entitled "Electrochromic Media for Producing a Pre-selected Color," U.S. Pat. No. 6,241,916 entitled "Electrochromic System," U.S. Pat. No. 6,193,912 entitled "Near Infrared-Absorbing Electrochromic Compounds and Devices Comprising Same," U.S. Pat. No. 6,249,369 entitled "Coupled Electrochromic Compounds With Photostable Dication Oxidation States," U.S. Pat. No. 6,137,620 entitled "Electrochromic Media With Concentration Enhanced Stability, Process for the Preparation Thereof and Use in Electrochromic Devices"; and U.S. Pat. No. 6,519,072 entitled "Electrochromic Device"; and International Patent Application Publication Nos. WO 1998/42796 entitled "Electrochromic Polymeric Solid Films, Manufacturing Electrochromic Devices Using Such Solid Films, and Processes for Making Such Solid Films and Devices," and WO 99/02621 entitled "Electrochromic Polymer Systems," which are herein incorporated by reference in their entirety.

In some embodiments, two groups of optical filters may be applied to implement the filter 24. A first group of optical filters may filter the visible spectral range and a second group of optical filters may filter the NIR spectral range. In a situation where one prefers to use the NIR mode, the filters may operate in the visible spectral range blocking the visible light, while the NIR filter is activated letting the NIR light go through the filter. The rate at which one switches between NIR mode and visible mode may be continuous or it may be dynamic. In a dynamic switching mode, the filter switches rapidly and continuously alternating between a visible and NIR. Additionally, in some embodiments one the filters may intermittently switch such that the image data received by the image sensor 16 alternates between a color and NIR in a dynamic switching mode acquisition. The image data may then be processed by one or more digital imaging techniques to extract the contours from the NIR image. The contours may then be combined and displayed on the screen overlapping the color visible image such that the NIR contour information is added to the color image, increasing the available information for the driver or the ADAS.

By rapidly alternating the activation of one or more of the filters, the image data received by the controller of the imaging system 12 may include color visible image data and NIR image data captured by the image sensor 16 (e.g. a single image sensor). By mixing the color visible image data and NIR image data the imaging system 12 may provide for accurate reconstruction of illumination sources and their reflections (e.g. red tail lights, stop lights, horizon colors, etc.). For example, halogen light sources may emit radiation in both the NIR and visible wavelengths. A halogen light illuminated through a red tail light filter may appear as a bright white in an RGB camera, which has been configured to pass NIR light. By collecting both the color visible image data and NIR image data, the imaging system may be operable to include color content that may otherwise be filtered during nighttime conditions due to the activation of the NIR filter. Additionally, during daytime conditions, the combined color visible image data and NIR image data processed by the imaging system 12 may provide for a contrast enhancement in shadows where visible energy may be weak and IR content is still present.

In some embodiments, the image sensor 16 with the filter 24 may work together with a NIR light source, external or embedded to the device, such as NIR light emitting diodes (LEDs). This configuration may enhance the visibility in situations with poor illumination conditions. The NIR LEDs may be continuously on during the NIR camera mode operation or can be synchronized in case the system 12 is in switching mode so that the LEDs are working when the NIR function is active. By turning off the NIR light source during visible mode operation, light leakage to the visible image may be minimized. Such leakage may otherwise decrease the color rendering index (CRI).

The pitch of the helical structure of some chiral liquid crystal polymers or cholesteric liquid crystals may vary with temperature. Such changes in the pitch may lead to a shift in the wavelengths blocked by the filters and a corresponding shift in the bandwidths of light (e.g., the ranges $\lambda_1$, $\lambda_2$, and $\lambda_3$) attenuated by the filters discussed herein. To limit temperature-related shifts changing the performance of the filters, the cholesteric materials utilized to produce the chiral liquid crystal polymers may be selected from species that exhibit only a small or negligible pitch shift in response to temperature. Additionally, the chiral liquid crystal polymers may include one or more stabilizing additives configured to stabilize the pitch (e.g., a polymerizable liquid crystal monomer additive). In this way, the performance of the filters discussed herein may be consistent over a temperature range anticipated for operation.

Figure 6:
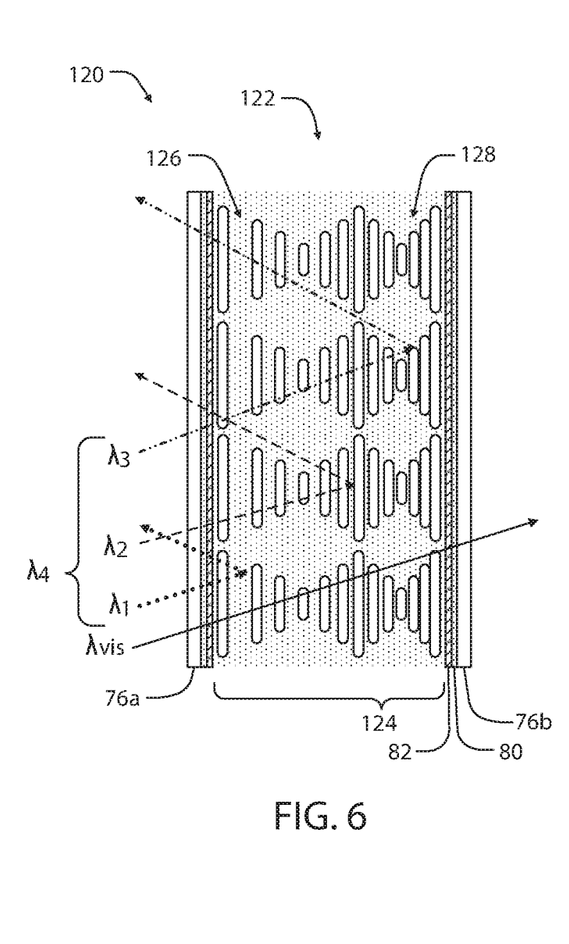
FIG. 6 is a schematic diagram of a filter configured to control a transmission of light of a range of wavelengths demonstrating a gradient configuration.

Referring now to FIG. 6, an exemplary embodiment of a gradient filter 120 is shown. The gradient filter 120 may comprise similar elements to the filters 24 and 100 and, accordingly, may utilize like reference numerals for clarity. The gradient filter 120 may comprise a first substrate 76a and a second substrate 76b. The first substrate 76a and the second substrate 76b may each comprise the conductive layer 80 and the alignment layer 82 on a side in contact with a gradient structure 122. In this configuration, the gradient filter 120 may be selectively activated in the first configuration 70 (e.g., the open circuit configuration) and the second configuration 72 (e.g., the closed circuit configuration). Accordingly, the filter may be selectively activated to reflect a range of wavelengths of light from entering the image sensor 16.

In the first configuration 70, the gradient structure 122 may be arranged in a neutral state wherein a helical twist structure may be formed due to an arrangement of the chiral liquid crystal polymer. In this way, the gradient structure 122 may operate similarly to the liquid crystal structure 74. Additionally, the gradient structure 122 may be configured to form a helical structure having an axial pitch that varies over a thickness 124. For example, the gradient structure 122 may comprise a first pitch 126 proximate the first substrate 76a and a second pitch 128 proximate the second substrate 76b. Between the first pitch 126 and the second pitch 128, the helical pitch of the gradient structure 122 may gradually change. In this configuration, as the pitch varies through the thickness 124, the gradient structure 122 may reflect or filter a fourth range $\lambda_4$ of wavelengths, which may comprise one or more of the first range $\lambda_1$, the second range $\lambda_2$, and the third range $\lambda_3$ as previously described. For example, the fourth range $\lambda_4$ may correspond to a combined range from approximately 650 nm to 950 nm.

As previously discussed, the wavelengths reflected by the chiral nematic filters discussed herein are controlled as a function of the pitch of the helix angle of the helical structure. By varying the pitch from the first pitch 126 to the second pitch 128 along a helical axis of the gradient structure 122, the range of the gradient filter 120 is increased relative to the individual structures 74a, 74b, and 74c. The gradient structure 122 may be configured by incorporating a photo-initiated component that may lock or fix the gradient structure 122. For example, the gradient structure 122 may comprise photo-initiated chains of polymers with a high crosslinking density in areas of increased pitch. In this way, the pitch of the helical structure may vary over the thickness 124 to provide for the gradient filter 120 to filter the fourth range $\lambda_4$ of wavelengths from entering the image sensor 16.

Figure 7:
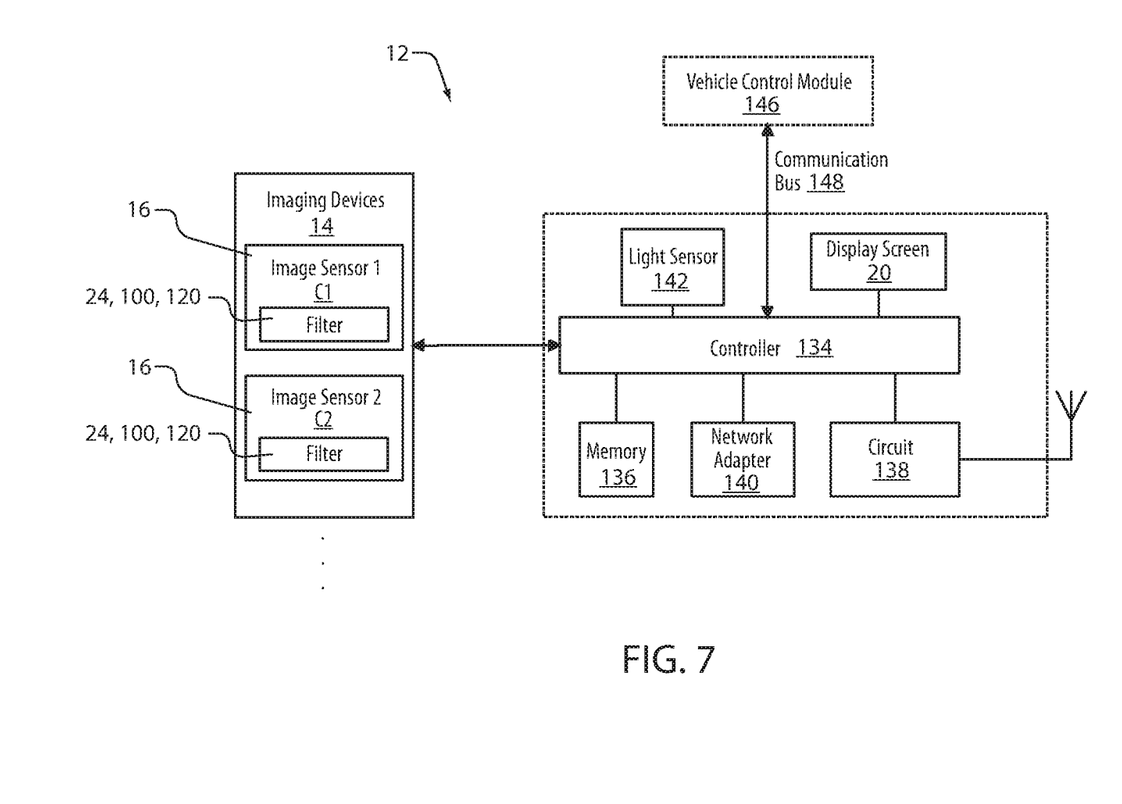
FIG. 7 is a block diagram of an imaging system in accordance with the disclosure.

Referring now to FIG. 7, a block diagram of the imaging system 12 is shown. The imaging system 12 may comprise a display screen 20. The display screen 20 may be implemented as a variety of display types. For example, the display screen 20 may correspond to a liquid crystal display (LCD), a plasma display, an organic light emitting diode (OLED) display, a field emission display (FED) panel, or various other displays. The display screen 20 may further incorporate a speaker, haptic feedback device (e.g., vibration motor), LEDs, or various other hardware components for providing an output.

The imaging system 12 may further comprise a controller 134. The controller 134 may include various types of control circuitry, digital and/or analog, and may include a microprocessor, microcontroller, application-specific integrated circuit (ASIC), graphics processing unit (GPU), or other circuitry configured to perform various input/output, control, analysis, and other functions to be described herein. In some embodiments, the controller 134 may be a system on a chip (SoC) individually or with additional hardware components described herein. The controller 134 may include a memory 136 (e.g., random access memory, read-only memory, flash memory, hard disk storage, flash memory storage, solid-state drive memory, etc.). Accordingly, the controller 134 may be operable to control the imaging system 12 including the image sensors 16 and filters 24, 100, and 120.

The memory 136 may be used to facilitate the functions of the imaging system 12 as described herein. Memory 136 may include computer code modules, data, computer instructions, or other information, which may be executed by the controller 134 or otherwise facilitate the functions of the imaging system 12 described herein. For example, the memory 136 may include processing instructions, identification information, device registry configurations, image processing and augmentation information, etc. The memory 136 and/or the controller 134 may facilitate the functions described herein using one or more programming techniques, data manipulation techniques, and/or processing techniques, such as using algorithms, routines, lookup tables, arrays, searching, databases, comparisons, instructions, etc.

The imaging system 12 may further comprise a communication circuit 138. The communication circuit 138 may correspond to a transceiver circuit or transmitter circuit coupled to the controller 134. The transceiver circuit may provide for the imaging system 12 to transmit and/or receive wireless communication signals. The wireless communication signals may be transmitted to or received from a variety of wireless devices (e.g., an original transmitter, home electronic device, mobile communications device, and/or remote device). The communication circuit 138 may be controlled by the controller 134. For example, the controller 134 may turn on or off the communication circuit 138, the controller 134 may send data using the communication circuit 138, format information, an activation signal, control signal, and/or other signals or data for transmission via the communication circuit 138, or otherwise control the communication circuit 138. Inputs from the communication circuit 138 may also be received by the controller 134. For example, software configurations, updates, user settings and other information may be received by the communication circuit 138 and stored in the memory 136 by the controller 134.

The controller 134 may be also coupled to a network adapter 140, receivers, and/or transmitters. In some embodiments, the network adapter 140 may be configured to communicate with the imaging devices 14. In some embodiments, the network adapter 140 may be or include a cellular transceiver. In this configuration, the imaging system 12 may use the network adapter 140 and/or an additional transceiver (e.g., a cellular transceiver) to access the internet, other networks, and/or network hardware. In some embodiments, the imaging system 12 may access the internet, other networks, and/or network hardware through an intermediate device in communication with the imaging system 12 such as the mobile device.

In an exemplary embodiment, the network adapter 140 may be configured to send/receive data and/or control signals to a mobile device. The network adapter 140 may communicate via various wireless communication protocols. For example, communication protocols may include, but are not limited to, Bluetooth® (e.g., a Bluetooth® low energy (BLE), Wi-Fi® (IEEE 802.11), ZigBee®, cellular, etc.), a wired interface and/or protocol (e.g., Ethernet, universal serial bus (USB), Firewire®, etc.), or other communication connections (e.g., infrared, optical, ultrasound, etc.).

In some embodiments, the imaging system 12 may comprise an ambient light sensor 142. The ambient light sensor 142 may be configured to identify an operating condition or light level of an operating environment of the imagining system 12. The ambient light sensor 142 may be in communication with the controller 134 and configured to communicate light data indicating an ambient lighting condition proximate the vehicle 10 (e.g., daylight condition, nighttime condition). In response to the indication of the lighting condition, the controller 134 may selectively activate the light filter (e.g., filter 24, 100, 120) such that one or more ranges of light are filtered from the received light impinging upon the image sensor 16. In this way, the imaging device 14 may prevent high-intensity infrared light from reaching the image sensor 16 in order to increase the color sensitivity and improve the color rendering index of image data captured during daylight conditions.

The controller 134 may be in communication with a vehicle control module 146 via a communication bus 148 of the vehicle 10. The communication bus 148 may be configured to deliver signals to the controller 134 identifying various states of the vehicle 10. For example, the communication bus 148 may be configured to communicate an operating condition of the vehicle 10 (e.g., the ignition is active, a gear selection, a lighting activation or setting, etc.), an ambient light level, a seat occupancy, a door ajar signal, driver/occupant identity or any other information or control signals that may be communicated via the communication bus 148. In this way, the controller 134 may communicate with the vehicle control module 146 to identify a variety of conditions and/or settings of the vehicle 10.

The following references may include various implementations for imager systems providing rearward facing panoramic views and are incorporated herein by reference in their entirety: U.S. Pat. No. 8,237,909 B2, entitled "VEHICLE REARVIEW MIRROR ASSEMBLY INCLUDING INTEGRATED BACKLIGHTING FOR A LIQUID CRYSTAL DISPLAY (LCD), filed Feb. 6, 2009, by John B. Ostreko et al.; and U.S. Pat. No. 8,411,245, entitled "MULTI-DISPLAY MIRROR SYSTEM AND METHOD FOR EXPANDED VIEW AROUND A VEHICLE," filed Sep. 30, 2009, by Ethan J. Lee et al. Though the imaging system 12 in the various implementations disclosed herein is shown incorporated in a rearview display system, a display may similarly be incorporated in a vehicle forward center console, as a heads-up display, or in any other location that may be visible to an operator or occupant of a vehicle.

It will be understood by one having ordinary skill in the art that construction of the described invention and other components is not limited to any specific material. Other exemplary embodiments of the invention disclosed herein may be formed from a wide variety of materials unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. An imaging device comprising:
an image sensor configured to capture image data;
a filter configured to selectively control a range of wavelengths of light entering the image sensor, wherein the filter comprises a liquid crystal structure configured to pass the range of wavelengths in a first configuration and reflect the range of wavelengths in a second configuration; and
a controller in communication with the image sensor and the filter, wherein the controller is configured to:
adjust the filter to the first configuration corresponding to a first timing of a first portion of a plurality of alternating image frames captured by the image sensor;
adjust the filter to the second configuration corresponding to a second timing of a second portion of the plurality of alternating image frames captured by the image sensor;
generate hybrid image data combining first image data from the first portion with second image data from the second portion; and
detect features in a scene depicted by the hybrid image data.

2. The device according to claim 1, wherein the range of wavelengths corresponds to light in a near-infrared (NIR) range.

3. The device according to claim 1, wherein the controller is further configured to identify a lighting condition as a daylight condition or a nighttime condition.

4. The device according to claim 3, wherein the controller is configured to the hybrid image data in response to an intensity of ambient light exceeding a predetermined threshold indicating the daylight condition.

5. The device according to claim 1, wherein the liquid crystal structure is configured to align in a helical configuration in the second configuration.

6. The device according to claim 1, wherein the liquid crystal structure comprises a chiral nematic structure.

7. The imaging device according to claim 1, wherein the liquid crystal structure comprises a chiral liquid crystal polymer.

8. The imaging device according to claim 1, wherein the filter is positioned between the image sensor and a path of incoming light entering the image sensor.

9. The imaging device according to claim 1, further comprising:
a circular polarizer positioned in a stacked configuration with the filter.

10. The imaging device according to claim 1, further comprising:
a plurality of IR filters positioned between the image sensor and a path of incoming light entering the imaging device.

11. The imaging device according to claim 1, further comprising:
an electrochromic device positioned between the image sensor and a path of incoming light entering the imaging device, wherein the filter is configured to control a transmission of a first band of wavelengths entering the image sensor and the electrochromic device is configured to control the transmission of a second band of wavelengths entering the image sensor.

12. The imaging device according to claim 11, wherein the controller is configured to independently control the filter and the electrochromic device to selectively pass the first band and the second band.

13. The imaging device according to claim 11, wherein the first band of wavelengths is in a Near Infrared (NIR) range and the second band of wavelengths is in a visible range.

14. A method for capturing image data for a vehicle imaging system, wherein the method comprises:
selectively filtering visible light from light entering an image sensor in a first configuration and passing the NIR light among alternating images directed to an image sensor;
capturing first image data comprising a first portion of the alternating images, wherein the first image data comprises the NIR light with the visible light filtered;
capturing second image data comprising a second portion of the alternating images, wherein the second image data comprises the visible light;
extracting contour features from the first image data;
combining the contour features from the first image data with the visible light of the second image data thereby generating hybrid image data, wherein the hybrid image data comprises the contour features from the first image data combined with color information from the second image data; and
displaying a video feed comprising the hybrid image data on a display screen.

15. The method according to claim 14, further comprising:
selectively filtering the NIR light from visible light in the second image data.

16. The method according to claim 14, wherein the contour features comprise at least one of contour information and high spatial frequency.

17. The method according to claim 14, further comprising:
displaying the hybrid image data on a display device of the vehicle.

18. An imaging device comprising:
an image sensor configured to capture image data comprising a series of images;
a plurality of filters configured to selectively transmit at least two wavelength bands of light entering the image sensor, wherein the plurality of filters comprise:
a first filter comprising a liquid crystal structure configured to transmit a first band of the wavelength bands in a first configuration and reflect the first band in a second configuration; and
a second filter configured to suppress a second band of the wavelength bands; and
a controller configured to:
activate the first filter to the first configuration and activate the second filter at a first timing of a first portion of the series of images;
activate the first filter to the second configuration at a second timing of a second portion of the plurality of the series of images; and generate hybrid image data in a video feed combining first portion with second portion.

19. The imaging device according to claim 18, wherein the first band comprises a NIR range of wavelengths and the second band comprises a visible range of wavelengths.

20. The imaging device according to claim 18, wherein the switching time between configurations is less than 1 second, preferably less than 0.1 seconds, and most preferably under 0.01 seconds.

* * * * *

UNITED STATES PATENT AND TRADEMARK OFFICE
CERTIFICATE OF CORRECTION

PATENT NO. : 10,547,783 B2
APPLICATION NO. : 15/962408
DATED : January 28, 2020
INVENTOR(S) : Saenger Nayver et al.

Page 1 of 1

It is certified that error appears in the above-identified patent and that said Letters Patent is hereby corrected as shown below:

On the Title Page

Item (22) "Filed: Apr. 28, 2018" should be -- Filed: Apr. 25, 2018 --.

Signed and Sealed this
Tenth Day of March, 2020

Andrei Iancu
*Director of the United States Patent and Trademark Office*